United States Patent [19]

Ota et al.

[11] Patent Number: 5,625,507
[45] Date of Patent: Apr. 29, 1997

[54] RECORDING AND/OR REPRODUCING APPARATUS THAT LOADS A TAPE CASSETTE INTO STANDBY POSITION WHILE RECORDING AND/OR REPRODUCING WITH ANOTHER TAPE CASSETTE

[75] Inventors: Hideyuki Ota; Seiichi Sawakami, both of Kanagawa; Susumu Konuta, Tokyo, all of Japan

[73] Assignee: Sony Corporation, Tokyo, Japan

[21] Appl. No.: 558,932

[22] Filed: Nov. 13, 1995

Related U.S. Application Data

[63] Continuation of Ser. No. 968,540, Oct. 29, 1992, abandoned.

[30] Foreign Application Priority Data

Nov. 6, 1991 [JP] Japan ................. 3-290112

[51] Int. Cl.⁶ .................................... G11B 15/68
[52] U.S. Cl. ................. 360/71; 360/92; 360/96.5
[58] Field of Search ................. 360/69, 92, 15, 360/96.5; 369/75.1, 77.1; D14/135, 136, 257

[56] References Cited

U.S. PATENT DOCUMENTS

| | | | |
|---|---|---|---|
| D. 327,678 | 7/1992 | Dennis | D14/135 |
| 3,703,251 | 11/1972 | Suzuki | 360/92 |
| 4,309,729 | 1/1982 | Kice | 360/69 X |
| 4,543,618 | 9/1985 | Sato | 360/15 |
| 4,704,651 | 11/1987 | Nagaya et al. | |
| 4,860,134 | 8/1989 | Hashimoto | 360/92 |
| 4,903,152 | 2/1990 | Matsui | 360/92 |

FOREIGN PATENT DOCUMENTS 0348242 12/1989 European Pat. Off. .

OTHER PUBLICATIONS

Sharp Owner's Manual for Model VC-5WZOE Double Video cassette recorder—May 25, 1988.
Technics Multi Compact Disc Player SL-PC10 Operating Instructions Feb. 1990, p. 6.

Primary Examiner—Aristotelis Psitos
Assistant Examiner—James L. Habermehl
Attorney, Agent, or Firm—William S. Frommer; Alvin Sinderbrand

[57] ABSTRACT

A recording and/or reproducing apparatus in which an access time required when a tape cassette is exchanged can be reduced so that, while one tape cassette is in the timer-activated operation mode, the ordinary operation is carried out by another tape cassette. At least two tape cassette insertion and/or eject openings (4A), (4B) are formed through a single panel (2). Further, this recording and/or reproducing apparatus includes a mechanical deck (5) which records and/or reproduces tape cassettes (3A), (3B) inserted from these tape cassette insertion and/or eject openings (4A), (4B). The tape cassettes (3A), (3B) can be loaded onto at least two trays (7A), (7B).

26 Claims, 10 Drawing Sheets

RECORDING AND/OR REPRODUCING APPARATUS THAT LOADS A TAPE CASSETTE INTO STANDBY POSITION WHILE RECORDING AND/OR REPRODUCING WITH ANOTHER TAPE CASSETTE

This application is a continuation of application Ser. No. 07/968,540, filed Oct. 29, 1992 now abandoned.

BACKGROUND OF THE INVENTION

1. Field of the Invention:

The present invention relates to a recording and/or reproducing apparatus of a double-cassette type and more particularly to a recording and/or reproducing apparatus which can continuously reproduce and/or record a record medium for a long period of time.

2. Description of the Prior Art:

Conventional video tape recorders (VTRs) known as a twin-type video tape recorder include a single housing within which a single drive mechanism for driving a magnetic recording medium such as a VTR cassette or the like is disposed to continuously record and/or reproduce two VTR cassettes.

Figure 1A:
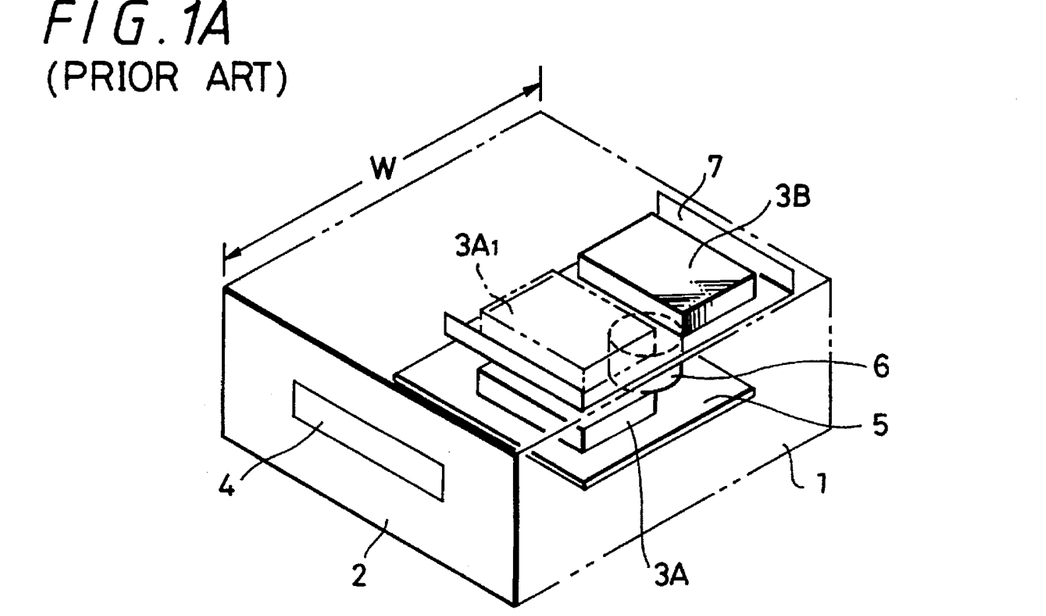
FIGS. 1A and 1B are schematic perspective views used to explain operation of a conventional recording and/or reproducing apparatus (video tape recorder), respectively.
Figure 1B:
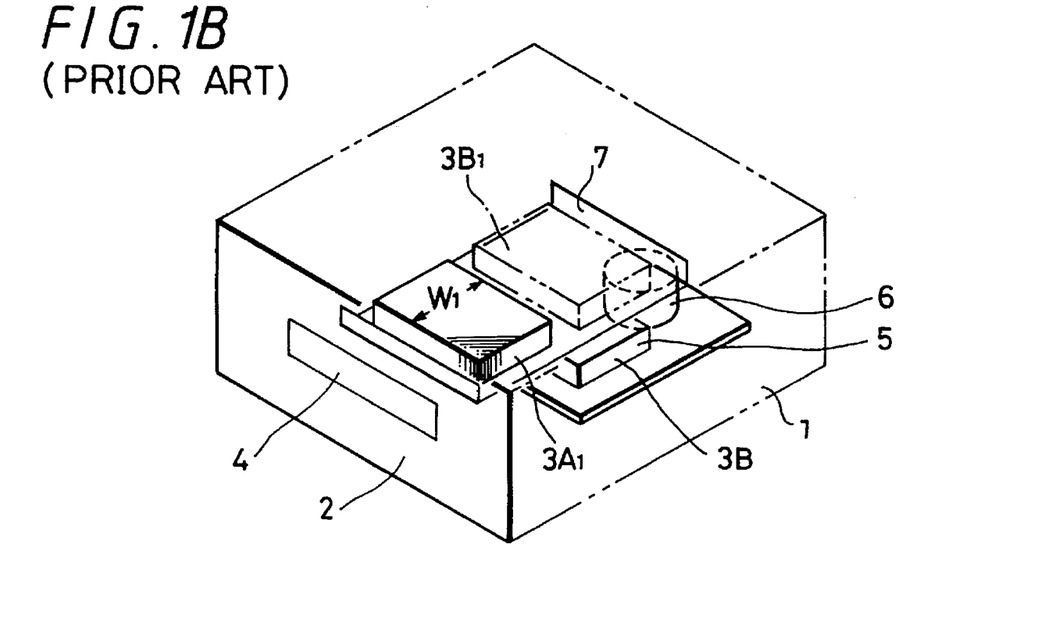

FIGS. 1A and 1B of the accompanying drawings are perspective views used to explain an arrangement and operation of the conventional twin-type VTR, respectively.

An overall arrangement of the twin-type VTR will be described with reference to FIGS. 1A and 1B. As shown in FIGS. 1A and 1B, a housing 1 has a configuration of a substantially box whose one side is opened. A front panel 2 thereof includes an insertion/eject opening 4 into and from which VHS cassettes or 8-mm video cassettes 3A, 3B, for example, are inserted and ejected.

A mechanical deck 5 is disposed on a chassis (not shown) fixed onto the front panel 2. The mechanical deck 5 includes a loading mechanism (not shown) which loads the cassettes 3A, 3B from the insertion/eject opening 4 and a drum mechanism 6 of a drive mechanism for driving a magnetic medium such as a VTR cassette or the like in the winding form.

A cassette tray 7 can be freely moved into and out of the housing 1 through the insertion/eject opening 4. The cassette tray 7 has a space sufficient so that at least two cassettes 3A, 3B can be placed thereon in parallel to each other along the depth direction of the housing 1. At least two cassettes 3A and 3B placed on the tray 7 can be ejected from the housing 1 through the insertion/eject opening 4.

This twin-VTR further includes mechanisms such that, when the cassettes 3A, 3B on the cassette tray 7 are brought over the mechanical deck 5, the cassettes 3A, 3B placed on the cassette tray 7 are descended on the mechanical deck 5 and can be recorded and reproduced and that the cassettes 3A, 3B on and from which video and audio signals have been recorded and reproduced are lifted and placed on the cassette tray 7, from which they are ejected to the insertion/eject opening 4.

Operation of the twin-VTR thus arranged will be described with reference to FIGS. 1A, 1B. As shown in FIG. 1A, the first cassette 3A is placed on the mechanical deck 5 and is being recorded or reproduced. At that very moment, the second cassette 3B that was inserted from the insertion/eject opening 4 of the housing 1 and placed on the cassette tray 7 is placed in the standby state at the inner part of the cassette tray 7.

When the recording and/or playback of the first cassette 3A is ended, the first cassette 3A is rewound and moved onto the cassette tray 7 so that the first cassette 3A is brought to the front of the second cassette 3B that is in standby state as shown by a two-dot chain line cassette $3A_1$.

Then, as shown in FIG. 1B, the cassette tray 7 is slid toward the insertion/eject opening 4 side, whereby the first cassette $3A_1$ placed on the cassette tray 7 can be ejected from the insertion/eject opening 4.

In the state shown in FIG. 1B, the second cassette 3B that was placed in the inner part of the cassette tray 7 is brought to the position of a two-dot chain line cassette $3B_1$ and lowered on the mechanical deck 5 so that it can become recordable and reproducible.

Since at this time the next third cassette is placed in the standby mode in the state shown in FIG. 1A, a plurality of cassettes can be continuously recorded and reproduced. Hence, the arrangement of the conventional twin-VTR is suitable for use with a long-play motion picture recording and so on.

According to the conventional twin-type VTR, only the second tape cassette is in the standby mode for recording and reproducing when the first tape cassette is in the recording and reproducing state. Therefore, if the first tape cassette 3A is being reproduced, for example, then the twin-type VTR will be operated in the following procedure:

(1) place the second tape cassette 3B on the tray 7 from which the first tape cassette 3A is ejected;

(2) move the tray 7 in the rearward;

(3) place the second tape cassette 3B in the standby mode;

(4) finish the playback of the first tape cassette 3A;

(5) move the tray 7 to the forward intermediate position;

(6) place the second cassette 3B on the tray 7 as the first tape cassette 3A is lifted;

(7) move the tray 7 in the forward direction (eject);

(8) set the mechanical deck 5 in the playback preparation state as the second tape cassette 3B, which is placed in the standby mode, is lowered;

(9) start the playback of the second tape cassette 3B; and (10) place the next tape cassette in the standby mode after the tray 7 is moved in the rearward.

That is, the access time is increased considerably because the relative position among the tape cassettes 3A, 3B and the mechanical deck 5 must be changed. Further, there is then the disadvantage such that the second tape cassette cannot be exchanged during the first tape cassette is being operated.

Furthermore, since the tray 7 is placed in the standby mode in the inner part of the housing 1, the depth of the housing 1 must be increased at least three times the depth $W_1$ of the cassettes 3A, 3B. There is then the disadvantage such the depth W of the housing 1 is extended extremely.

OBJECTS AND SUMMARY OF THE INVENTION

Therefore, it is an object of the present invention to provide an improved recording and/or reproducing apparatus in which the aforesaid shortcomings and disadvantages of the prior art can be eliminated.

It is another object of the present invention to provide a recording and/or reproducing apparatus in which an access time required when a tape cassette is exchanged can be reduced considerably.

It is a further object of the present invention to provide a recording and/or reproducing apparatus in which a second tape cassette can be exchanged regardless of the state in which a first tape cassette is placed.

It is still a further object of the present invention to provide a recording and/or reproducing apparatus suitable for continuous reproduction and continuous recording.

As a first aspect of the present invention, there is provided a recording and/or reproducing apparatus which comprises first and second opening portions into which first and second tape cassettes are inserted, first and second conveying units (trays) for conveying tape cassettes inserted from the first and second opening portions, a selecting portion for selecting one of the cassettes conveyed by the first and second conveying units, and a recording and/or reproducing unit for setting the tape cassette, selected by the selecting portion, in the recording and/or reproducing mode.

As a second aspect of the present invention, there is provided a recording and/or reproducing apparatus which comprises first and second opening portions into which first and second tape cassettes are inserted, first and second conveying units (trays) for conveying tape cassettes inserted from the first and second opening portions, a selecting portion for selecting one of the cassettes conveyed by the first and second conveying units, a recording and/or reproducing unit for setting the tape cassette, selected by the selecting portion, in the recording and/or reproducing mode, and a control unit for controlling the conveying units so that the cassettes are conveyed.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

The present invention will now be described in detail with reference to the drawings. In the following embodiments, a recording and/or reproducing apparatus according to the present invention is applied to a so-called 8-mm video tape recorder, for example. In the following sheets of drawings, elements and parts identical to those of FIGS. 1A and 1B are marked with the same references and therefore need not be described in detail.

The recording and/or reproducing apparatus of the present invention includes a plurality of tape cassette standby portions for the single mechanical deck 5 and therefore can freely access these plural tape cassettes.

Figure 2:
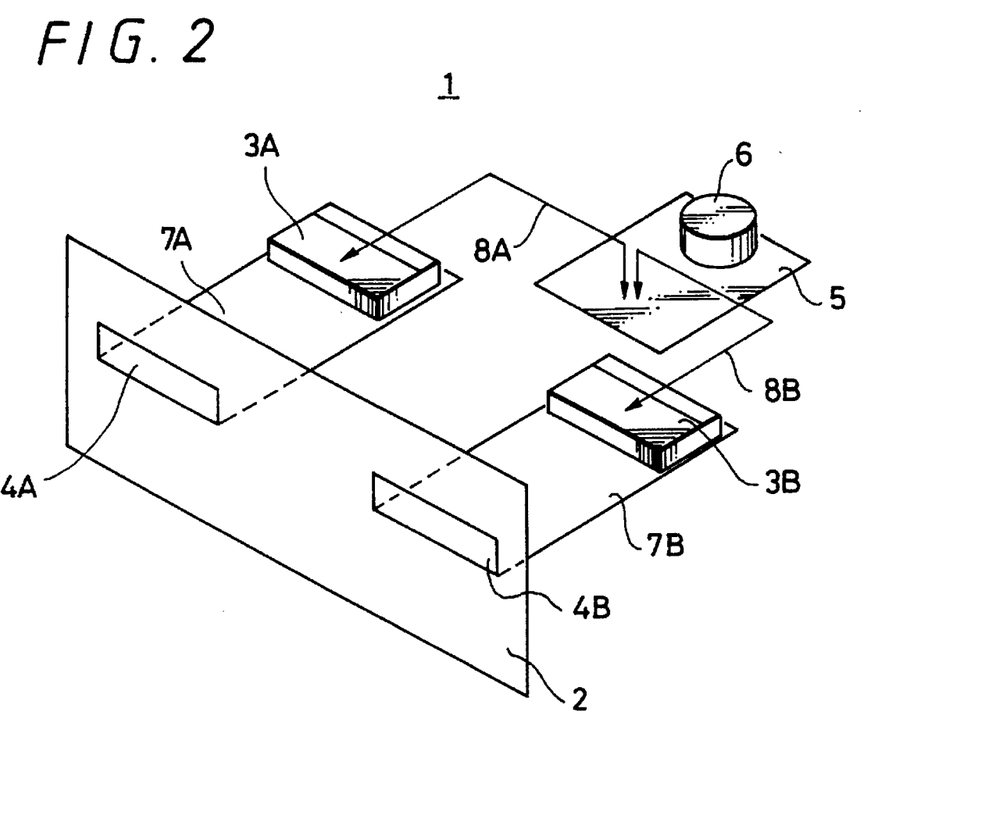
FIG. 2 is a schematic perspective view showing a recording and/or reproducing apparatus according to a first embodiment of the present invention.

FIG. 2 of the accompanying drawings shows an overall schematic perspective view of a first embodiment of the recording and/or reproducing apparatus according to the present invention. As shown in FIG. 2, the front panel 2 of this recording and/or reproducing apparatus is disposed in front of the similar box-shaped housing 1 having the opening portion formed on one side thereof similarly to that shown in FIGS. 1A, 1B. The mechanical deck 5 is disposed on a chassis (not shown) secured to the panel 2.

On the left and right sides of the panel 2, there are provided first and second cassette insertion and/or eject openings 4A, 4B into and/or from which the first and second 8-mm video tape recorder cassettes (hereinafter simply referred to as tape cassettes ) 3A and 3B are inserted and/or ejected. First and second trays 7A, 7B are disposed in association with the first and second insertion and/or eject openings 4A, 4B. The first and second tape cassettes 3A, 3B set on the first and second trays 7A, 7B are brought to the portion near the mechanical deck 5 by means of slide members (not shown).

The first and second tape cassettes 3A and 3B set on the first and second trays 7A and 7B can be independently accessed onto the mechanical deck 5 as shown by arrows 8A, 8B and also can be independently accessed onto the first and second trays 7A, 7B from the mechanical deck 5, respectively.

Various operation key groups disposed on the front panel 2 of this recording and/or reproducing apparatus will hereinafter be described with reference to FIG. 3 of the accompanying drawings.

Figure 3:
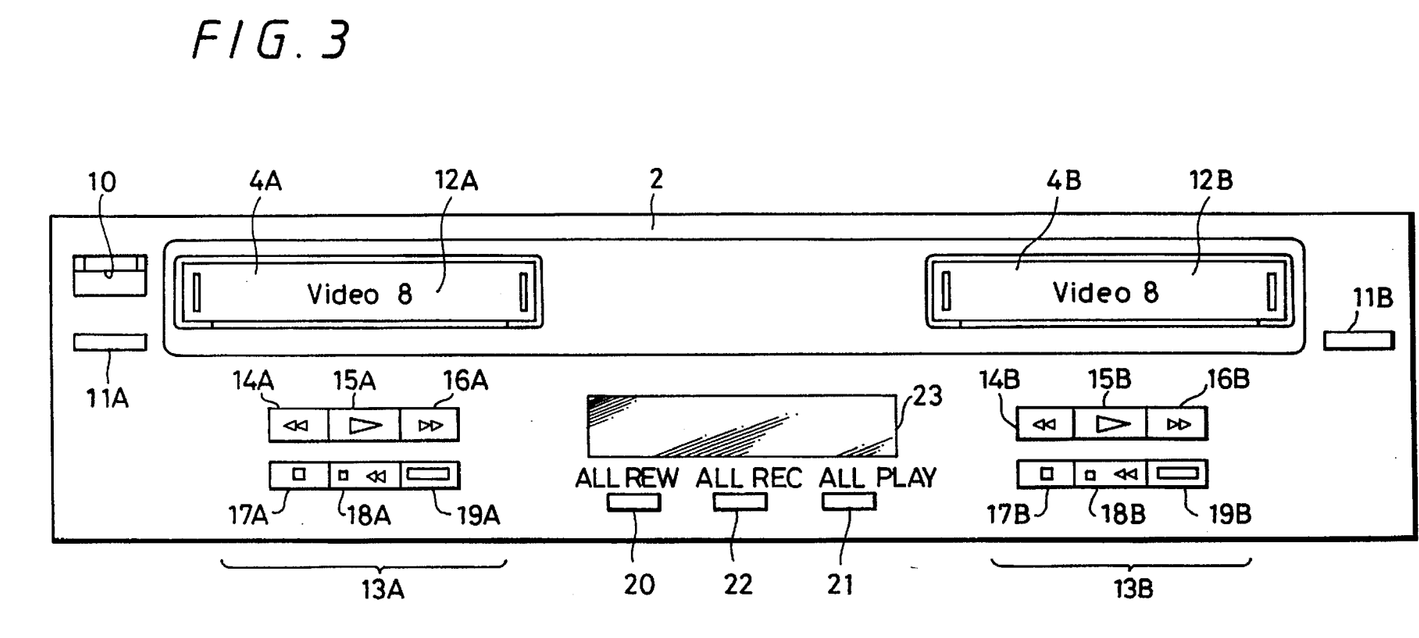
FIG. 3 is a front view showing a front panel of the recording and/or reproducing apparatus according to the first embodiment of the present invention.

In FIG. 3, reference numeral 10 designates a power switch or power key that turns on and/or turns off the power of this recording and/or reproducing apparatus. As shown in FIG. 3, eject keys 11A, 11B are respectively disposed on the left and right sides of the insertion and/or eject openings 4A and 4B so as to eject the first and second tape cassettes 3A and 3B set on the first and second trays 7A and 7B within the insertion and/or eject openings 4A and 4B.

Covers 12A, 12B, disposed on the first and second tape cassette insertion and/or eject openings 4A, 4B, are each made of a transparent synthetic resin or the like so that titles or the like on the rear surfaces of the first and second tape cassettes 3A, 3B set on the first and second trays 7A, 7B can be visually confirmed. Therefore, the user can confirm through the cover 12A or 12B at least whether the tape cassette is inserted into the tray 7A or 7B within the housing 1.

A first operation key group 13A is used to operate the tape cassette 3A inserted into the first insertion and/or eject opening 4A in various modes and a second operation key group 13B is used to operate the second tape cassette 3B inserted into the second insertion and/or eject opening 4B in various operation modes.

The first and second operation key groups 13A and 13B comprise rewind keys 14A, 14B for setting the tape cassettes 3A, 3B in the rewind modes, playback keys 15A, 15B for setting the tape cassettes 3A, 3B in the playback modes, fast forward keys 16A, 16B for setting the tape cassettes 3A, 3B in the fast forward modes, pause keys 17A, 17B for setting the tape cassettes 3A, 3B in the pause modes, stop keys 18A, 18B for setting the cassettes 3A, 3B in the stop modes, and recording keys 19A, 19B for setting the cassettes 3A, 3B in the recording modes.

Further, there are disposed an all rewind key (ALL•REW) 20 that rewinds all of the first and second cassettes 3A, 3B, an all play key (ALL•PLAY) 21, for setting the tape cassettes 3A, 3B in the play modes, all recording key (ALL•REC) 22 for recording all of the first and second tape cassettes 3A, 3B or the like, if necessary.

When the ALL•REW key 20 is pressed, all the first and second cassettes (plurality of tape cassettes) 3A, 3B set in the first and second trays 7A, 7B are rewound. When the ALL•PLAY key 21 (ALL•REC key 22) is pressed, the first tape cassette 3A set in the standby mode on the first tray 7A is reproduced (recorded). Then, after the play (recording) of the first cassette 3A is finished, the first tape cassette 3A is ejected onto the first tray 7A and the second cassette 3B set in the standby mode on the second tray 7B is brought onto the mechanical deck 5 and then placed in the play (recording) mode.

In FIG. 3, reference numeral 23 designates an display means such as an LCD (liquid crystal display) or the like which displays thereon whether or not the first and second tape cassettes 3A, 3B are on the first and second trays 7A, 7B, the state of the magnetic medium such as the tape cassette 3A or 3B set on the mechanical deck 5 or the like. Furthermore, when the first and second tape cassettes 3A, 3B are set onto the first and second trays 7A, 7B, the display means 23 displays a message indicating such that much more tape cassettes are inhibited from being set on the first and second trays 7A, 7B.

Operation of the recording and/or reproducing apparatus according to the first embodiment of the present invention will be described below.

The respective operation keys shown in FIG. 3 are controlled by a microcomputer (not shown and will hereinafter be referred to as a CPU (central processing unit)). That is, the CPU controls the drive mechanism of the mechanical deck 5 and the loading and unloading of the tape cassettes onto and from the first and second trays 7A, 7B.

Figure 4:
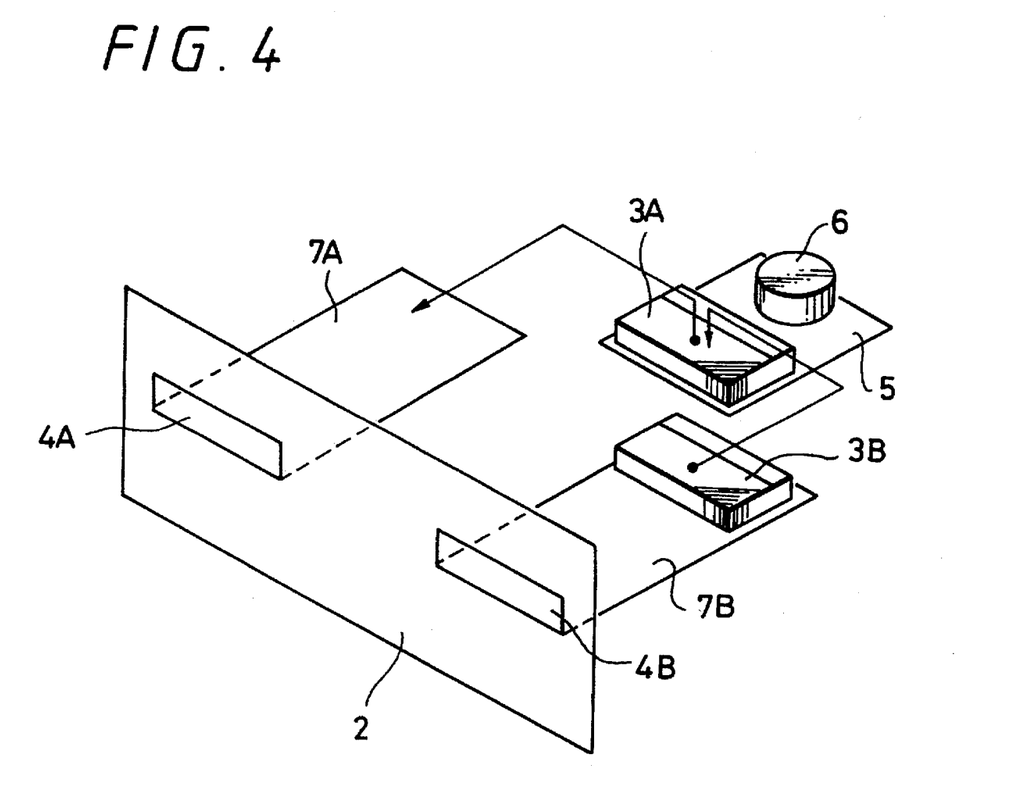
FIG. 4 is a schematic perspective view used to explain operation of the recording and/or reproducing apparatus according to the first embodiment of the present invention.

If the play key 15A in the first operation key group 13A is pressed under the condition that the first and second tape cassettes 3A, 3B on the first and second trays 7A, 7B are set in the standby mode as shown in FIG. 2, then the first tape cassette 3A is loaded onto the mechanical deck 5 as shown in FIG. 4. If the record key 19B in the second operation key group 13B, for example, is pressed during the first tape cassette 3A is being played back, then the first tape cassette 3A, which is being played back, is unloaded from the mechanical deck 5 and placed on the first tray 7A, and the second cassette 3B on the second tray 7B is loaded onto the mechanical deck 5, thereby being placed in the recording mode.

Operation similar to the above-mentioned operation is carried out in response to the functions of the first and second operation key groups 13A, 13B as fundamental operations, whereby the recording and/or reproducing apparatus is set in target operation modes. Some specific features of the recording and/or reproducing apparatus according to this embodiment will be described hereinafter.

A long time continuous recording according to this embodiment will be described first.

When the reserved recording is carried out, first and second empty cassettes 3A and 3B are set in the first and second trays 7A, 7B and a reserve recording time is set. In that case, the ALL•REC key 22 is depressed. At the reserve recording start time, the CPU sends a control signal to bring the first tape cassette 3A on the first tray 7A onto the mechanical deck 5 and then loads the tape thereof onto the drum 6 of the mechanical deck 5, to thereby start the reservation. When the tape in the first tape cassette 3A reaches its tape end, the first tape cassette 3A is automatically ejected onto the first tray 7A and the second tape cassette 3B set on the second tray 7B in the standby mode is brought onto the mechanical deck 5. Then, the tape in the second cassette 3B is loaded onto the drum 6 of the mechanical deck 5 and the recording is started again. Therefore, the recording whose recording time is twice as long as the ordinary recording time becomes possible.

Video signals in the period of time where the first and second tape cassettes 3A, 3B are accessed from the first and second trays 7A, 7B to the mechanical deck 5 and in the period of time where the tape is loaded onto the drum 6 are stored in a memory or the like and the continuous recording can be carried out.

When the recording is effected in a manual fashion, the first cassette 3A is set in the recording mode by pressing the ALL•REC key 22. Thus, during this recording mode, the second tape cassette 3B is set on the second tray 7B in the standby mode. When the tape in the first tape cassette 3A reaches its tape end, the first tape cassette 3A is automatically ejected from the mechanical deck 5 to the first tray 7A. Simultaneously, the second tape cassette 3B set on the second tray 7B in the standby mode is accessed onto the mechanical deck 5 and the tape in the second tape cassette 3B is loaded onto the drum 6 of the mechanical deck 5, thereby the recording being started. The first tape cassette 3A thus ejected is exchanged with other tape cassette and again placed on the first tray 7A in the standby mode. If a sequence of the above operations are carried out repeatedly, then the recording can be carried out continuously.

More specifically, the long time continuous recording becomes possible. In particular, the recording and/or reproducing apparatus of this embodiment becomes suitable for recording events such as a movie or the like. Since the recording and/or reproducing apparatus includes at least the two trays 7A and 7B, the process in which the tray is moved to the intermediate position to access the cassette in the standby mode onto the mechanical deck 5 after the cassette on which the recording or playback was already finished was ejected from the mechanical deck 5 having the single tray may be removed unlike the prior art, thereby making it possible to reduce the access time considerably.

Further, according to this embodiment, the recording and/or reproducing apparatus can perform the ordinary operation even in the timer-activated recording mode.

That is, an ordinary recording and/or reproducing apparatus having a single insertion and eject opening cannot effect the playback and rewinding during the timer-activated standby mode. According to this embodiment, while the timer-activated recording is effected on the first tape cassette 3A side, the ordinary operation such as the recording and reproducing can be effected on the second tape cassette 3B side by the second operation key group 13B.

At the timer-activated recording starting time, an alarm or the like is energized and the second tape cassette 3B, which is in the ordinary operation mode, e.g., in the playback mode, is ejected onto the second tray 7B. Then, the first tape cassette 3A set on the first tray 7A in the standby mode is accessed onto the mechanical deck 5 and the tape in the first tape cassette 3A is loaded onto the drum 6, thereby the recording being made possible immediately.

Moreover, the random access recording can be carried out with ease. Fundamentally, the tape cassettes on which the recording is to be made are set on the first and second trays and either the timer-activated recording or the manual recording may be freely selected by the user.

By way of example, the tape cassette 3A of the high image quality tape, distributed under the product name of Hi-8 or S-VHS, is set on the first tray 7A and the tape cassette 3B of the normal tape is set on the second tray 7B. Then, the user randomly selects the tape such that only the tape cassette 3A on the first tray 7A that the user wants to recording the event at high image quality is recorded thereon. Alternatively, one user, such as a parent, can use the tape cassette 3A on the first tray 7A to record on and reproduce from the parent's own cassette, while another user, such as a child, can use the tape cassette 3B on the second tray 7B to record on and reproduce from the child's tape cassette.

In order to start the timer-activated recording in the random recording mode according to this embodiment, an information representative of the tape cassette of the tape cassettes in the standby mode on which the recording is to be effected must be added to the reserved content. In the manual operation, either of the first and second tape cassettes 3A, 3B in the standby mode may be selected by the first or second operation key group 13A or 13B. Therefore, the tape cassette may be properly used in response to the selected content to be recorded or the user.

Figure 5:
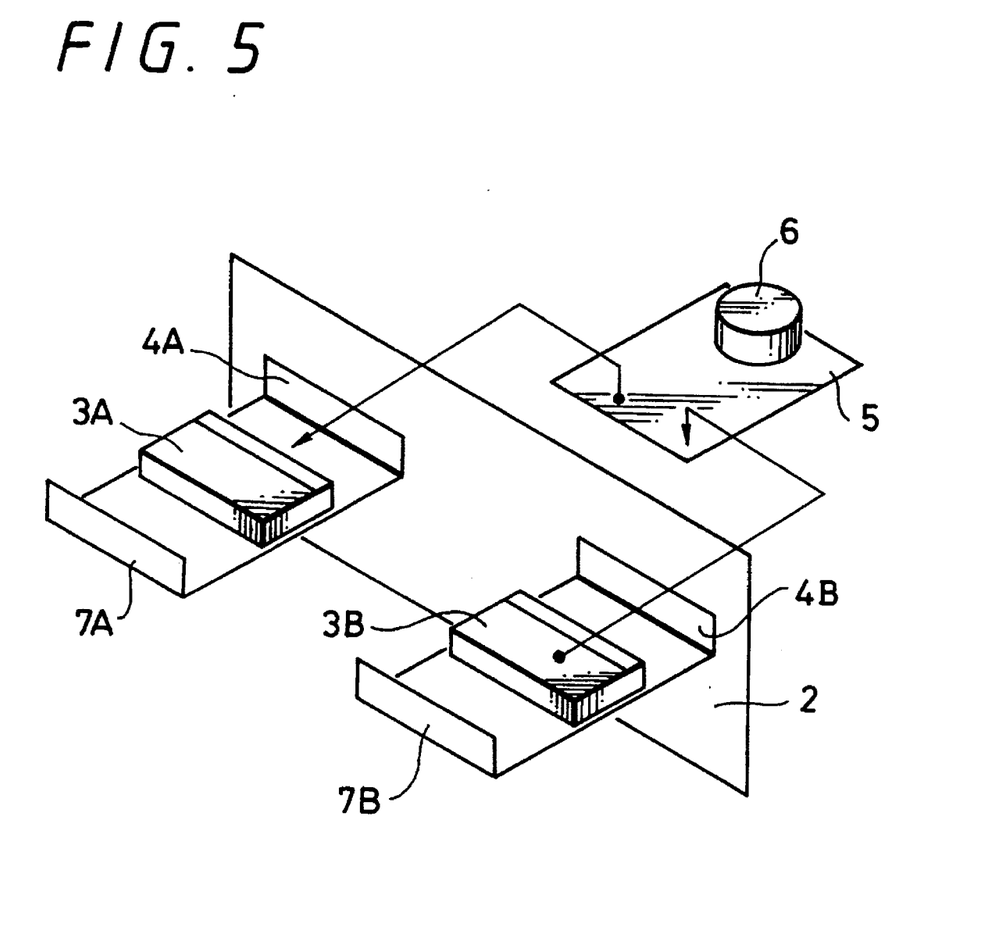
FIG. 5 is a schematic perspective view showing the recording and/or reproducing apparatus according to a second embodiment of the present invention.

While the VTR tape cassettes 3A, 3B are pushed into the insertion and/or reject opening 4A or 4B so that the tape cassettes 3A, 3B are loaded onto the first and second trays 7A, 7B according to the recording and/or reproducing apparatus shown in FIGS. 2 to 4, the recording and/or reproducing apparatus may be modified as a tray-withdraw type such that, as shown in FIG. 5, the first and second trays 7A, 7B are withdrawn from the insertion and/or eject openings 4A, 4B.

FIGS. 6 to 10 of the accompanying drawings show an arrangement of the recording and/or reproducing apparatus according to a second embodiment of the present invention and access states thereof.

Figure 6:
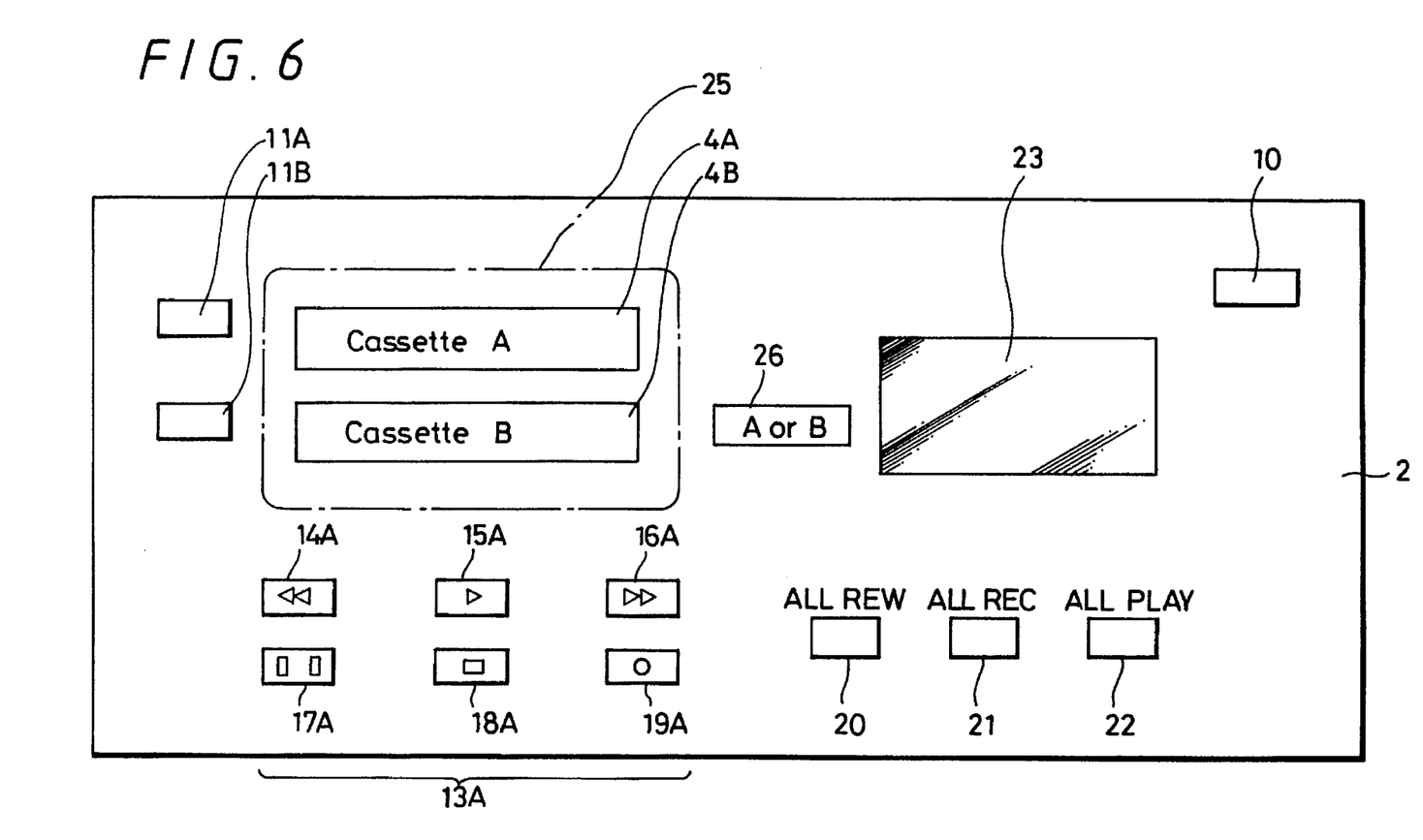
FIG. 6 is a front view showing a front panel of the recording and/or reproducing apparatus according to the second embodiment of the present invention.

In FIG. 6, like parts corresponding to those of FIG. 2 are marked with the same references and therefore need not be described in detail.

As shown in FIG. 6, in accordance with the second embodiment of the present invention, the insertion and/or eject openings 4A, 4B into and/or from which the 8-mm video tape cassette or the like is inserted and/or ejected are disposed, for example, on upper and lower left sides on the panel 1. The first and second tape cassettes 3A, 3B (hereinafter referred to as tape cassettes A, B) inserted into the two insertion and/or eject openings 4A, 4B are driven by a single drive mechanism 25 (see FIG. 7). This drive mechanism 25 includes a recording and/or reproducing mechanism, a loading mechanism or the like, though not shown.

A selection key 26 that is used to select the cassette A or B is disposed at the central portion of the front panel 2.

When the selection key 26 is pressed once, the cassette A side is selected and the character A is illuminated. When the selection key 16 is pressed twice, the cassette B side is selected and the character B is illuminated. The aforesaid operation key group 13A also is formed as the self-illumination type key switch similarly.

On the lower side of the selection key 26, there is provided the first operation key group 13A which can be commonly utilized for the first and second tape cassettes A and B. This first operation key group 13A comprises the rewind key 14A, the play key 15A, the fast forward key 16A, the pause key 17A, the stop key 18A and the recording key 19A, similarly to FIG. 3.

Eject keys 11A, 11B are disposed in parallel to each other in response to the insertion and/or eject openings 4A, 4B of the tape cassettes A, B.

Operation of the recording and/or reproducing apparatus shown in FIG. 6 will be described with reference to FIGS. 7 to 10.

Figure 7:
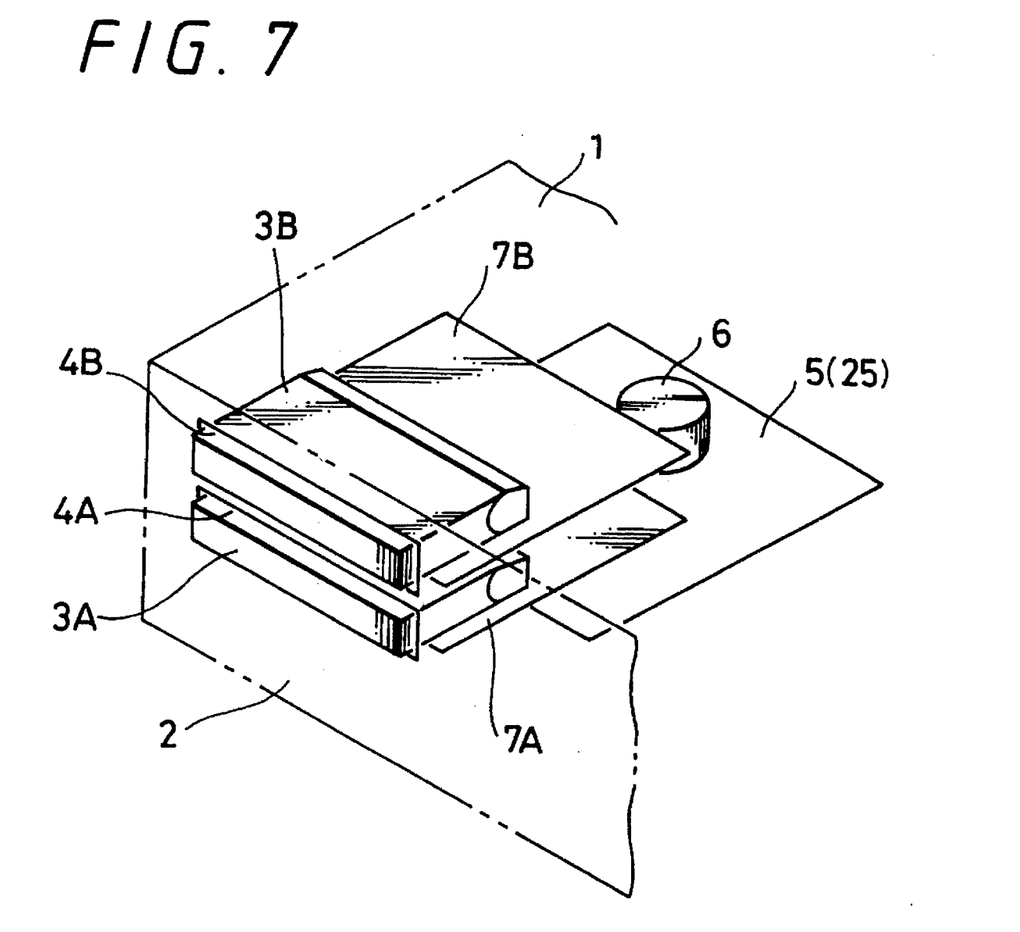
FIG. 7 is a perspective view used to explain first operation of the second embodiment of the recording and/or reproducing apparatus according to the present invention.

FIG. 7 of the accompanying drawings shows the condition such that the first and second cassettes A, B, i.e., 3A, 3B are loaded on to the first and second trays 7A, 7B from the insertion and/or eject openings 4A, 4B.

Figure 8:
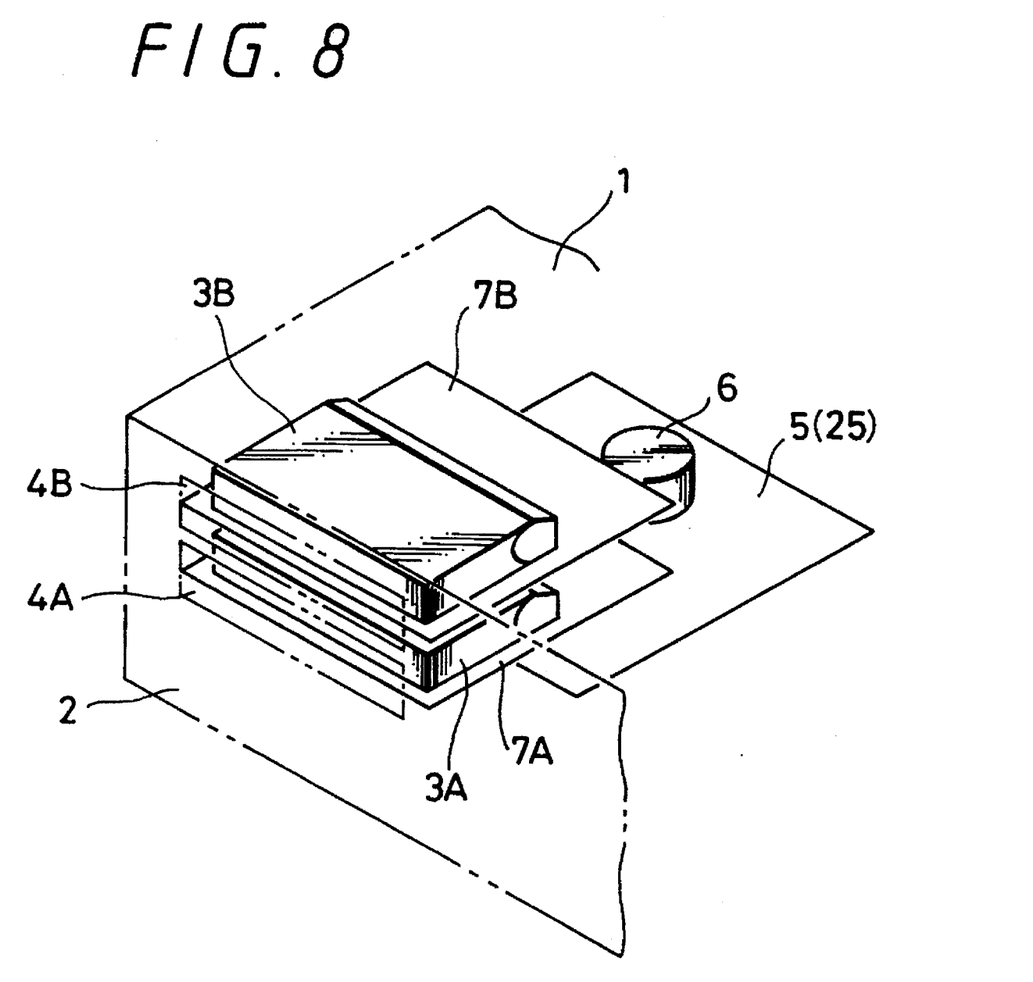
FIG. 8 is a perspective view used to explain second operation of the recording and/or reproducing apparatus according to the second embodiment of the present invention.

FIG. 8 of the accompanying drawings shows the condition such that the first and second tape cassettes A, B, i.e., 3A, 3B are loaded onto the first and second trays 7A, 7B at their predetermined positions and set in the standby states by the drive mechanism 25 of the mechanical deck 5.

Figure 9:
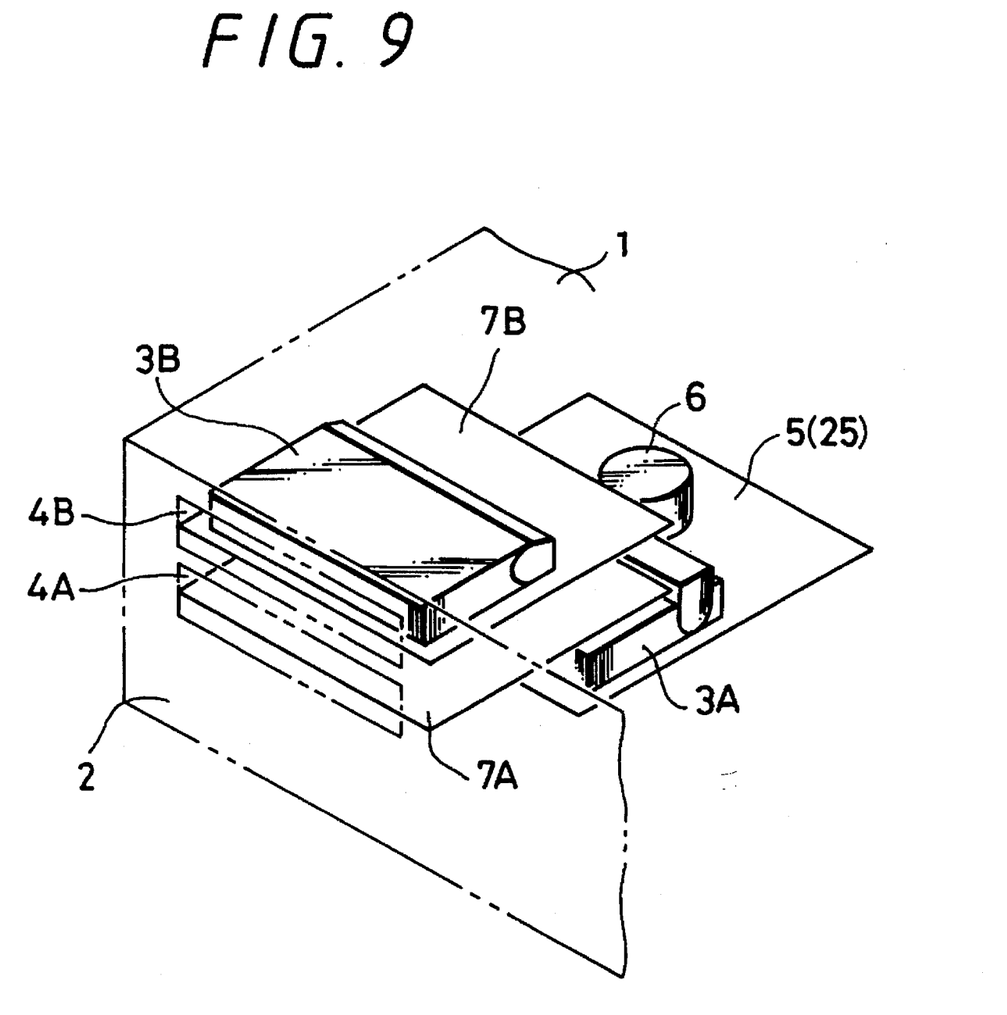
FIG. 9 is a perspective view used to explain third operation of the recording and/or reproducing apparatus according to the second embodiment of the present invention.

If the ALL·REC key 21 or ALL·PLAY key 22 is depressed in order to effect the recording or playback during the two tape cassettes A, B, i.e., 3A, 3B are set on the first and second trays 7A, 7B in the standby mode, then the first tape cassette A (3A) on the first tray 7A is accessed on the mechanical deck 5 and then the tape in the tape cassette 3A is loaded onto the drum 6 of the mechanical deck 5, thereby the tape cassette A (3A) being placed in the recording and/or reproducing mode as shown in FIG. 9.

Figure 10:
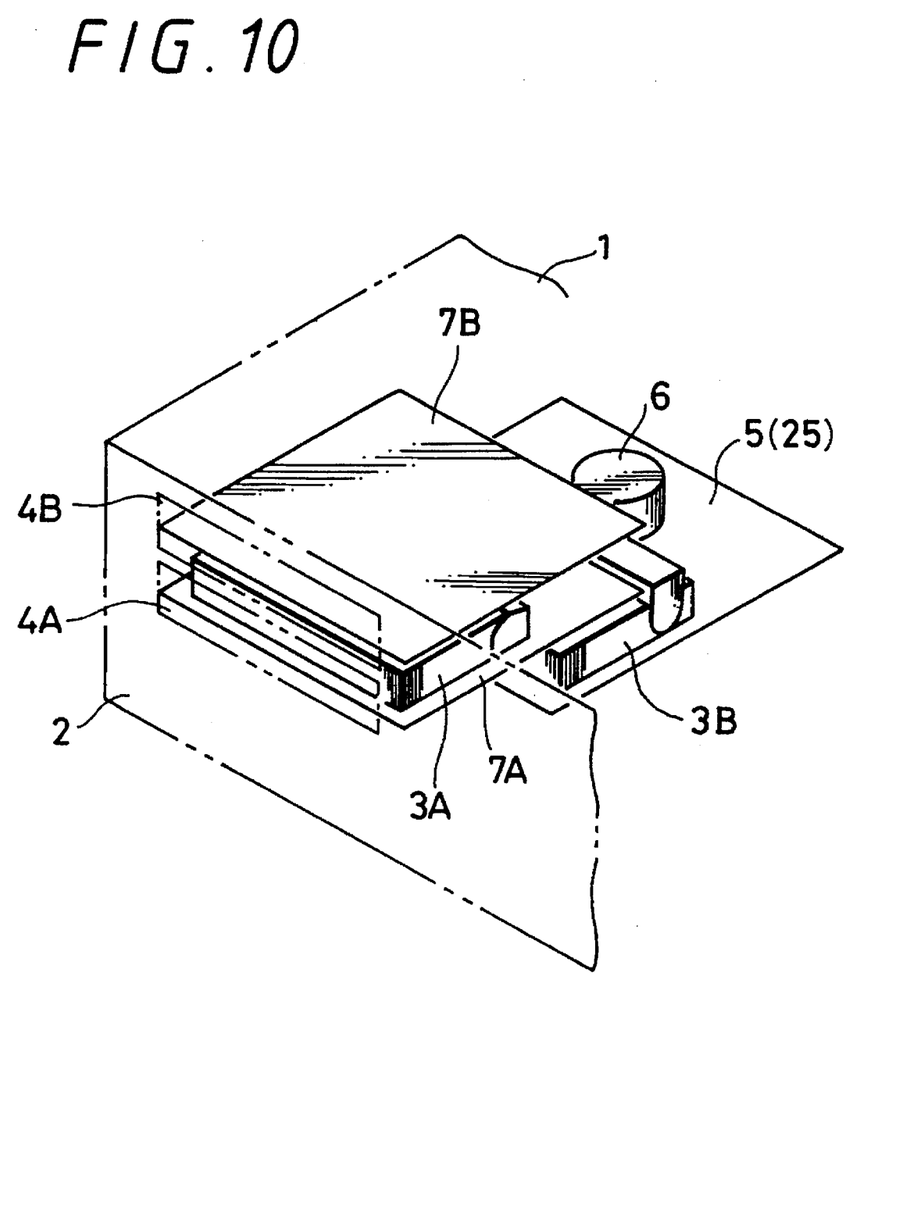
FIG. 10 is a perspective view used to explain fourth operation of the recording and/or reproducing apparatus according to the second embodiment of the present invention.

When the tape in the cassette tape A (3A) reaches the tape end, the transport of the tape is automatically stopped. Then, the tape cassette 3A is accessed onto the first tray 7A and ejected. Simultaneously, as shown in FIG. 10, the tape cassette 3B, set on the second tray 7B, is accessed onto the mechanical deck 5 and the tape in the tape cassette B (3B) is loaded onto the drum 6 of the mechanical deck 5 and automatically set in the recording and/or reproducing mode. Similarly, the continuous recording and/or reproducing will be carried out hereinafter.

According to the present invention, it is possible to obtain the recording and/or reproducing apparatus capable of long time recording and reproducing and whose access time can be reduced. Further, in this recording and/or reproducing apparatus, the rewinding operation, the fast forward operation or the recording and reproducing operation can be carried out even in the timer-activated operation mode. Furthermore, the depth of the housing 1 can be reduced.

According to the present invention, it is possible to obtain the recording and/or reproducing apparatus whose access time can be reduced and in which a tape cassette can be changed in a short period of time. Furthermore, this recording and/or reproducing apparatus can perform other operations even in the timer-activated operation mode.

While the present invention is applied to the VHS or 8-mm video cassette as described above, the present invention is not limited thereto and may be similarly applied to recording and/or reproducing apparatus for music cassettes, recordable discs and so on.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An apparatus for recording and/or reproducing signals onto and/or from first and second recording media stored within first and second tape cassettes, respectively, said apparatus comprising:

a panel having first and second open portions through which said first and second tape cassettes are completely inserted therethrough;

first and second conveying means for respectively conveying the tape cassettes inserted through said first and second open portions to first and second standby positions;

selecting means for selecting one of the tape cassettes conveyed by said first and second conveying means; and a common recording and/or reproducing device for receiving each tape cassette selected by said selecting means within a relatively small amount of time after being selected and for respectively recording and/or reproducing signals onto and/or from the recording medium stored therein;

said first and second conveying means being operative to convey either of said first and second tape cassettes to the respective one of said first and second standby positions even when a recording and/or reproducing operation is being performed involving the other of said first and second tape cassettes and said first and second standby positions being located in relatively close proximity to said common recording and/or reproducing device so as to minimize the time for the selected tape cassette to be supplied to said common recording and/or reproducing device.

2. The apparatus for recording and/or reproducing signals according to claim 1, wherein said first and second conveying means include trays, said trays being moved in substantially a horizontal direction to convey said tape cassettes.

3. The apparatus for recording and/or reproducing signals according to claim 2, wherein said first and second open portions are disposed in said panel such that one of said first and second open portions lies to the left of the other of said first and second open portions.

4. The apparatus for recording and/or reproducing signals according to claim 1, wherein each of said first and second tape cassettes have a predetermined width (W) and wherein said first and second standby positions are located within a distance of said panel having a value which is substantially less than three times said predetermined width W so as to enable said apparatus to have a relatively small width.

5. An apparatus for recording and/or reproducing signals onto and/or from first and second recording media stored within first and second tape cassettes, respectively, said apparatus comprising:

a panel having first and second open portions through which said first and second tape cassettes are completely inserted therethrough;

first and second conveying means for respectively conveying the tape cassettes inserted through said first and second open portions to first and second standby positions;

selecting means for selecting one of the tape cassettes conveyed by said first and second conveying means;

a common recording and/or reproducing device for receiving each tape cassette selected by said selecting means within a relatively small amount of time of being selected and for respectively recording and/or reproducing signals onto and/or from the recording medium stored therein; and control means for controlling said first and second conveying means;

said first and second conveying means being adaptable to convey either of said first and second tape cassettes to the respective one of said first and second standby positions even when a recording and/or reproducing operation is being performed involving the other of said first and second tape cassettes and said first and second standby positions being located in relatively close proximity to said common recording and/or reproducing device so as to minimize the time for the selected tape cassette to be supplied to said common recording and/or reproducing device.

6. The apparatus for recording and/or reproducing signals according to claim 5, wherein said control means includes an operator control portion disposed on said panel between said first and second open portions.

7. The apparatus for recording and/or reproducing signals according to claim 5, wherein said control means controls said common recording and/or reproducing device and wherein said control means includes first and second operation portions for controlling the recording and/or reproducing of signals onto and/or from said first and second recording media stored within said first and second tape cassettes inserted through said first and second open portions, respectively, said first and second operation portions disposed on said panel near said first and second open portions, respectively.

8. The apparatus for recording and/or reproducing signals according to claim 7, wherein said control means further includes a third operation portion disposed between said first and second operation portions for controlling both said first and second tape cassettes.

9. The apparatus for recording and/or reproducing signals according to claim 8, wherein said third operation portion includes on an upper portion thereof a display for displaying an operation state of said apparatus relating to said first and second tape cassettes.

10. The apparatus for recording and/or reproducing signals according to claim 5, wherein said control means includes an operator control portion, and wherein said first and second open portions are disposed in said panel such that one of said first and second open portions lies above the other of said first and second open portions and said operator control portion is disposed on said panel so as to lie laterally away from said first and second open portions.

11. The apparatus for recording and/or reproducing signals according to claim 5, wherein said control means controls said common recording and/or reproducing device and wherein said control means includes first and second operation portions for controlling the recording and/or reproducing of signals onto and/or from said first and second recording media stored within said first and second tape cassettes inserted through said first and second open portions, respectively, said first and second operation portions being disposed on said panel near said first and second open portions, respectively, in a lateral direction.

12. The apparatus for recording and/or reproducing signals according to claim 11, wherein said control means further includes a third operation portion disposed between said first and second operation portions for controlling both said first and second tape cassettes.

13. The apparatus for recording and/or reproducing signals according to claim 5, wherein each of said first and second tape cassettes have a predetermined width (W) and wherein said first and second standby positions are located within a distance of said panel having a value which is substantially less than three times said predetermined width W so as to enable said apparatus to have a relatively small width.

14. An apparatus for recording and/or reproducing signals onto and/or from first and second recording media stored within first and second storage housings, respectively, said apparatus comprising:

a panel having first and second open portions through which said first and second storage housings are completely inserted therethrough;

first and second conveying means for respectively conveying the storage housings inserted through said first and second open portions to first and second standby positions;

selecting means for selecting one of the storage housings conveyed by said first and second conveying means; and a common recording and/or reproducing device for receiving each storage housing selected by said selecting means within a relatively small amount of time after being selected and for respectively recording and/or reproducing signals onto and/or from the recording medium stored therein;

said first and second conveying means being adaptable to convey either of said first and second storage housings to the respective one of said first and second standby positions even when a recording and/or reproducing operation is being performed involving the other of said first and second storage housings and said first and second standby positions being located in relatively close proximity to said common recording and/or reproducing device so as to minimize the time for the selected storage housing to be supplied to said common recording and/or reproducing device.

15. The apparatus for recording and/or reproducing signals according to claim 14, wherein said first and second conveying means include trays, said trays being moved in substantially a horizontal direction to convey said storage housings.

16. The apparatus for recording and/or reproducing signals according to claim 15, wherein said first and second open portions are disposed in said panel such that one of said first and second open portions lies to the left of the other of said first and second open portions.

17. The apparatus for recording and/or reproducing signals according to claim 14, wherein each of said first and second storage housings have a predetermined width (W) and wherein said first and second standby positions are located within a distance of said panel having a value which is substantially less than three times said predetermined width W so as to enable said apparatus to have a relatively small width.

18. An apparatus for recording and/or reproducing signals onto and/or from first and second recording media stored within first and second storage housings, respectively, said apparatus comprising:

a panel having first and second open portions through which said first and second storage housings are completely inserted therethrough;

first and second conveying means for respectively conveying the storage housings inserted through said first and second open portions to first and second standby positions;

selecting means for selecting one of the storage housings conveyed by said first and second conveying means;

a common recording and/or reproducing device for receiving each storage housing selected by said selecting means within a relatively small amount of time after being selected and for respectively recording and/or reproducing signals onto and/or from the recording medium stored therein; and control means for controlling said first and second conveying means;

said first and second conveying means being adaptable to convey either of said first and second storage housings to the respective one of said first and second standby positions even when a recording and/or reproducing operation is being performed involving the other of said first and second storage housings and said first and second standby positions being located in relatively close proximity to said common recording and/or reproducing device so as to minimize the time for the selected storage housing to be supplied to said common recording and/or reproducing device.

19. The apparatus for recording and/or reproducing signals according to claim 18, wherein said control means includes an operator control portion disposed on said panel between said first and second open portions.

20. The apparatus for recording and/or reproducing signals according to claim 18, wherein said control means controls said common recording and/or reproducing device and wherein said control means includes first and second operation portions for controlling the recording and/or reproducing of signals onto and/or from said first and second recording media stored within said first and second storage housings inserted through said first and second open portions, respectively, said first and second operation portions disposed on said panel near said first and second open portions, respectively.

21. The apparatus for recording and/or reproducing signals according to claim 20, wherein said control means further includes a third operation portion disposed between said first and second operation portions for controlling both said first and second storage housings.

22. The apparatus for recording and/or reproducing signals according to claim 21, wherein said third operation portion includes on an upper portion thereof a display for displaying an operation state of said apparatus relating to said first and second storage housings.

23. The apparatus for recording and/or reproducing signals according to claim 18, wherein said control means includes an operator control portion, and wherein said first and second open portions are disposed in said panel such that one of said first and second open portions lies above the other of said first and second open portions and said operator control portion is disposed on said panel so as to lie laterally away from said first and second open portions.

24. The apparatus for recording and/or reproducing signals according to claim 18, wherein said control means controls said common recording and/or reproducing device and wherein said control means includes first and second operation portions for controlling the recording and/or reproducing of signals onto and/or from said first and second recording media stored within said first and second storage housings inserted through said first and second open portions, respectively, said first and second operation portions being disposed on said panel near said first and second open portions, respectively, in a lateral direction.

25. The apparatus for recording and/or reproducing signals according to claim 24, wherein said control means further includes a third operation portion disposed between said first and second operation portions for controlling both said first and second storage housings.

26. The apparatus for recording and/or reproducing signals according to claim 18, wherein each of said first and second storage housings have a predetermined width (W) and wherein said first and second standby positions are located within a distance of said panel having a value which is substantially less than three times said predetermined width W so as to enable said apparatus to have a relatively small width.

\* \* \* \* \*